US012736043B2

(12) United States Patent
Matsuyama et al.

(10) Patent No.: US 12,736,043 B2
(45) Date of Patent: Sep. 15, 2026

(54) LIQUID FEEDING DEVICE AND INKJET RECORDING APPARATUS

(71) Applicant: KYOCERA Document Solutions Inc., Osaka (JP)

(72) Inventors: Ryo Matsuyama, Osaka (JP); Shuji Osaki, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 198 days.

(21) Appl. No.: 18/824,403

(22) Filed: Sep. 4, 2024

(65) Prior Publication Data

US 2025/0083450 A1 Mar. 13, 2025

(30) Foreign Application Priority Data

Sep. 8, 2023 (JP) ................................ 2023-146357

(51) Int. Cl.

| | |
|---|---|
| ***F04B 43/02*** | (2006.01) |
| ***B41J 2/175*** | (2006.01) |
| ***F04B 43/04*** | (2006.01) |
| ***F04B 53/20*** | (2006.01) |

(52) U.S. Cl.

CPC .......... *F04B 43/02* (2013.01); *B41J 2/17563* (2013.01); *B41J 2/17596* (2013.01); *F04B 43/04* (2013.01); *F04B 53/20* (2013.01); *B41P 2251/11* (2013.01); *F04B 43/043* (2013.01); *F04B 43/046* (2013.01)

(58) Field of Classification Search

CPC ....... F04B 43/02; F04B 53/20; B41J 2/17563; B41J 2/17596; B41J 2/175; B41J 2/14; B41J 2/17503; B41P 2251/11

See application file for complete search history.

(56) References Cited

U.S. PATENT DOCUMENTS

| | | | | |
|---|---|---|---|---|
| 3,617,157 A * | 11/1971 | Phillips | F04B 43/02 | 417/571 |
| 3,912,423 A * | 10/1975 | Pfabe | F04B 53/1037 | 417/313 |
| 4,594,058 A * | 6/1986 | Fischell | A61M 5/14224 | 92/99 |
| 5,332,372 A * | 7/1994 | Reynolds | F04B 43/067 | 417/393 |
| 9,205,665 B2 * | 12/2015 | Kaneko | F04B 43/046 | |
| 9,944,087 B2 * | 4/2018 | Sato | B41J 2/17509 | |
| 10,173,434 B2 * | 1/2019 | Asawa | F04B 43/02 | |
| 10,688,802 B2 * | 6/2020 | Kimura | F04B 53/16 | |

(Continued)

FOREIGN PATENT DOCUMENTS

| | | | |
|---|---|---|---|
| GB | 2292345 A * | 2/1996 | F04B 43/043 |
| JP | 2016150571 A * | 8/2016 | |

(Continued)

*Primary Examiner* — Matthew T Largi

(74) *Attorney, Agent, or Firm* — Stein IP, LLC

(57) ABSTRACT

A liquid feeding device includes a diaphragm pump, a suction unit, a discharge unit, and a filter unit. The filter unit includes a filter disposed between the suction unit and the discharge unit, so as to cover a liquid flow cross section. The suction unit and the discharge unit are arranged in a stacking manner so that the filter unit is sandwiched between them, and that an inflow chamber of the suction unit and an outflow chamber of the discharge unit face the diaphragm on one side in a reciprocating direction of the diaphragm.

11 Claims, 11 Drawing Sheets

(56) References Cited

U.S. PATENT DOCUMENTS

| | | | | |
|---|---|---|---|---|
| 2007/0195144 | A1* | 8/2007 | McNestry | B41J 2/16552 347/85 |
| 2008/0055378 | A1* | 3/2008 | Drury | B41J 2/19 347/92 |
| 2018/0154648 | A1* | 6/2018 | Atsumi | B41J 2/175 |
| 2019/0023021 | A1 | 1/2019 | Atsumi | |
| 2020/0263678 | A1* | 8/2020 | Goto | F04B 23/02 |
| 2025/0083449 | A1* | 3/2025 | Daigo | B41J 2/17563 |

FOREIGN PATENT DOCUMENTS

| | | | | |
|---|---|---|---|---|
| JP | 2019-023436 A | | 2/2019 | |
| JP | 2019044768 A | * | 3/2019 | F04B 53/20 |

* cited by examiner

LIQUID FEEDING DEVICE AND INKJET RECORDING APPARATUS

INCORPORATION BY REFERENCE

This application is based upon and claims the benefit of priority from the corresponding Japanese Patent Application No. 2023-146357 filed Sep. 8, 2023, the entire contents of which are hereby incorporated by reference.

BACKGROUND

The present disclosure relates to a liquid feeding device and an inkjet recording apparatus.

As a recording apparatus such as a printer or a copier, an inkjet recording apparatus is widely used, which ejects ink to a recording medium such as paper so as to record an image, because it can record a high definition image. In this inkjet recording apparatus, a pump conveys ink from an ink container that stores the ink to a recording head that ejects the ink to the recording medium. As this pump, a diaphragm pump is known.

SUMMARY

A liquid feeding device according to one aspect of the present disclosure includes a diaphragm pump, a suction unit, a discharge unit, and a filter unit. The diaphragm pump conveys liquid by reciprocating movement of a diaphragm. The suction unit includes a suction check valve configured to allow the liquid to flow only in a suction direction with respect to the diaphragm, and an inflow chamber into which the liquid flows through the suction check valve. The discharge unit includes a discharge check valve configured to allow the liquid to flow only in a discharge direction with respect to the diaphragm, and an outflow chamber from which the liquid entering from the inflow chamber flows out toward the discharge check valve. The filter unit is disposed between the suction unit and the discharge unit, and includes a filter covering a flow cross section of the liquid. The suction unit and the discharge unit sandwich the filter unit, and are arranged in a stacking manner so as that the inflow chamber and the outflow chamber face the diaphragm on one side in a reciprocating direction of the diaphragm. The filter unit includes the filter, an upstream side case, a downstream side case, and an inner seal member. The upstream side case and the downstream side case sandwich the filter between the upstream side and the downstream side in a liquid flow direction with respect to the filter. The inner seal member is disposed between the upstream side case and the downstream side case so as to prevent the liquid from leaking from the filter unit to the outside.

DETAILED DESCRIPTION

Hereinafter, an embodiment of the present disclosure is described with reference to the drawings. Note that the present disclosure is not limited to the following description.

Figure 1:
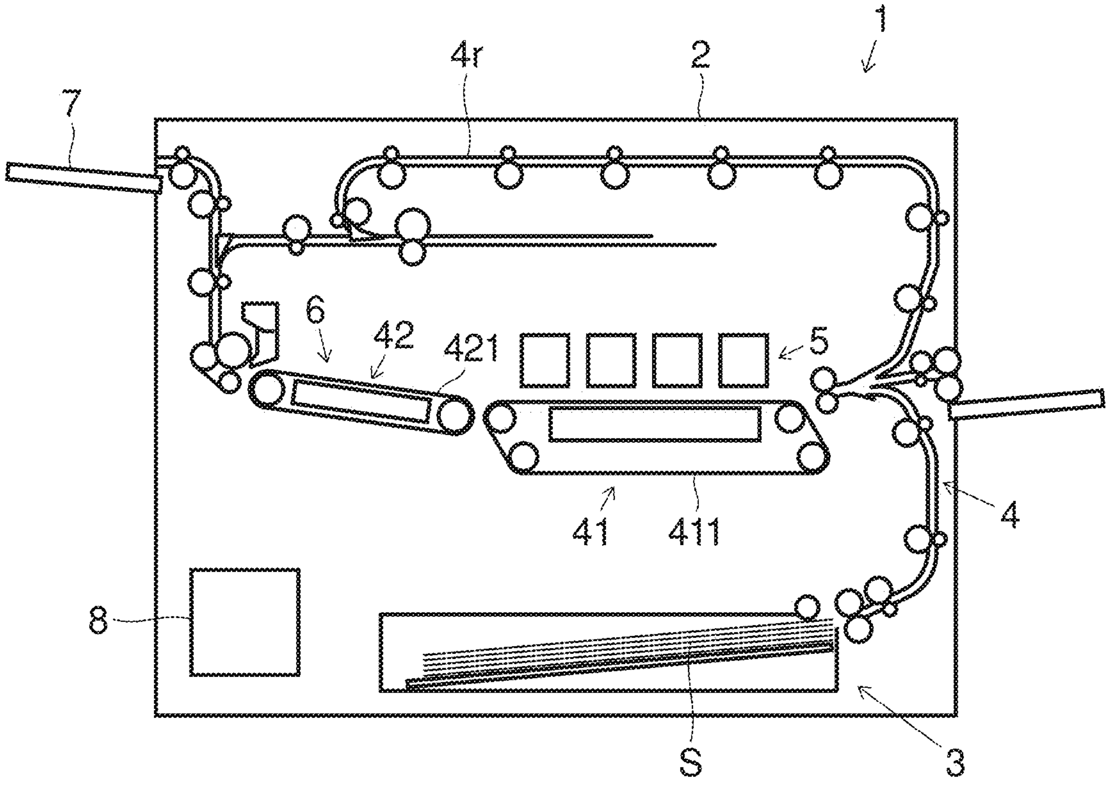
FIG. 1 is a schematic cross-sectional front view of an inkjet recording apparatus according to one embodiment of the present disclosure.
Figure 2:
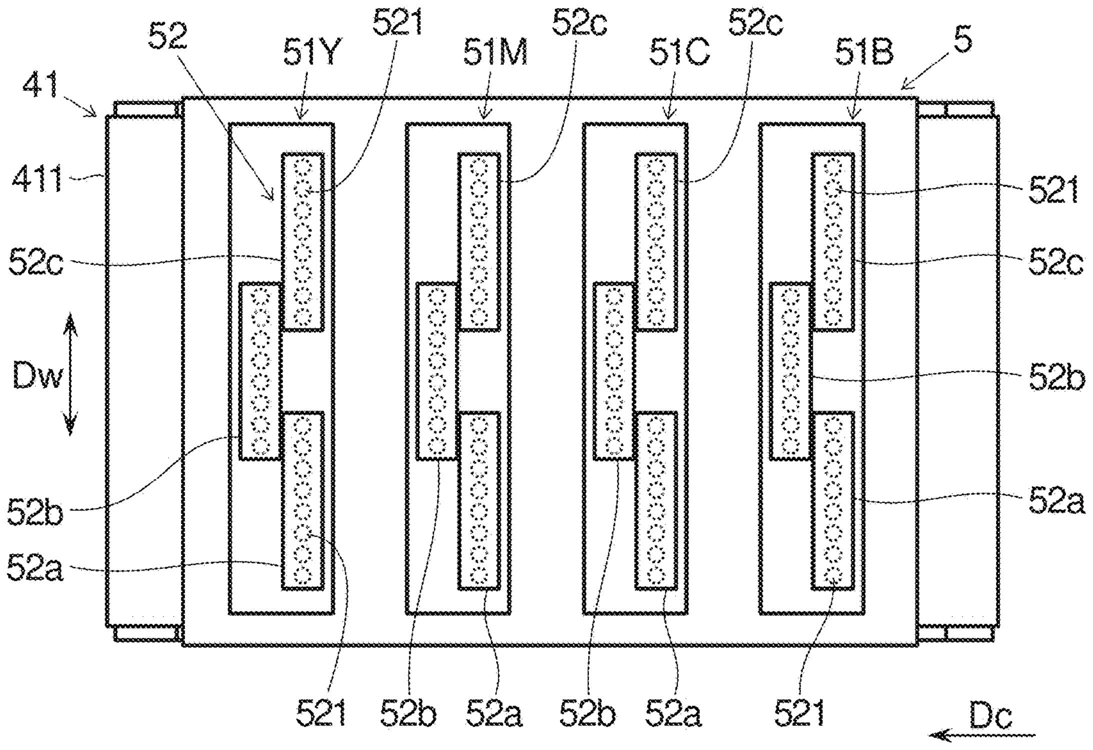
FIG. 2 is a plan view of a recording unit and its vicinity of the inkjet recording apparatus illustrated in FIG. 1.

FIG. 1 is a schematic cross-sectional front view of an inkjet recording apparatus 1 of the embodiment. FIG. 2 is a plan view of a recording unit 5 and its vicinity of the inkjet recording apparatus 1 illustrated in FIG. 1. The inkjet recording apparatus 1 is an inkjet recording type printer, for example. As illustrated in FIGS. 1 and 2, the inkjet recording apparatus 1 includes an apparatus main body 2, a paper sheet supply unit 3, a paper sheet conveyance unit 4, the recording unit 5, a drying unit 6, a paper sheet discharge unit 7, and a control unit 8.

The paper sheet supply unit 3 is disposed in a lower part of the apparatus main body 2, for example. The paper sheet supply unit 3 stores a plurality of paper sheets (recording media) S, and it separates and sends out the paper sheets S one by one when recording.

The paper sheet conveyance unit 4 is disposed on a downstream side of the paper sheet supply unit 3 in a paper sheet conveying direction, so as to convey the paper sheet S sent out from the paper sheet supply unit 3. The paper sheet conveyance unit 4 conveys the paper sheet S to the recording unit 5 and the drying unit 6, and further discharges the paper sheet S after recording and drying to the paper sheet discharge unit 7. The paper sheet conveyance unit 4 includes a reverse conveyance unit 4*r*, for example. When performing two-side recording, the paper sheet conveyance unit 4 sends the paper sheet S after recording and drying on a first side to the reverse conveyance unit 4*r*, and switches the conveying direction so as to convey the paper sheet S whose front and back sides are reversed to the recording unit 5 and the drying unit 6 again.

The paper sheet conveyance unit 4 includes a first belt conveyance unit 41 and a second belt conveyance unit 42. The first belt conveyance unit 41 includes an endlessly formed first conveyor belt 411. The second belt conveyance unit 42 includes an endlessly formed second conveyor belt 421. The first belt conveyance unit 41 and the second belt conveyance unit 42 suck and hold the paper sheet S on upper side surfaces (upper surfaces) of the first conveyor belt 411 and the second conveyor belt 421, respectively, so as to convey the same. The first belt conveyance unit 41 is disposed below the recording unit 5 so as to convey the paper sheet S. The second belt conveyance unit 42 is disposed in the drying unit 6 on the downstream side of the first belt conveyance unit 41 in the paper sheet conveying direction, so as to convey the paper sheet S.

The recording unit 5 is disposed on the downstream side of the paper sheet supply unit 3 in the paper sheet conveying direction, so as to face the first belt conveyance unit 41. The recording unit 5 faces the paper sheet S sucked and held on the upper surface of the first conveyor belt 411 so as to be conveyed, and is disposed above the first conveyor belt 411 with a predetermined interval between them. In other words, the recording unit 5 faces the paper sheet S conveyed by the paper sheet conveyance unit 4.

As illustrated in FIG. 2, the recording unit 5 includes head units 51B, 51C, 51M, and 51Y corresponding to black, cyan, magenta, and yellow colors, respectively. The head units 51B, 51C, 51M, and 51Y are arranged side by side along a paper sheet conveying direction Dc, in such a manner that their longitudinal directions are parallel to a paper sheet width direction Dw perpendicular to the paper sheet conveying direction Dc. Note that the four head units 51B, 51C, 51M, and 51Y have the same basic structure, and the suffixes "B", "C", "M", and "Y" indicating colors may be omitted in the following description, unless specification is necessary.

The head unit 51 of each color has a line type inkjet recording head 52. In the head unit 51 of each color, the recording head 52 includes a plurality of (e.g. three) heads 52*a*, 52*b*, and 52*c* arranged in a zigzag shape along the paper sheet width direction Dw.

The recording head 52 has a plurality of ink ejection nozzles 521 formed at the bottom part. The plurality of ink ejection nozzles 521 are arranged along the paper sheet width direction Dw, so that ink can be ejected over the entire recording region on the paper sheet S. In other words, the recording head 52 includes the plurality of ink ejection nozzles 521 that eject ink onto the paper sheet S. The recording unit 5 ejects ink sequentially from the recording heads 52 of the head units 51B, 51C, 51M, and 51Y of four colors, to the paper sheet S that is conveyed by the first conveyor belt 411, so as to record a full color image or a monochrome image on the paper sheet S.

The drying unit 6 is disposed on the downstream side of the recording unit 5 in the paper sheet conveying direction, and the second belt conveyance unit 42 is disposed in it. The paper sheet S on which an ink image is recorded in the recording unit 5 is sucked and held by the second conveyor belt 421 in the drying unit 6 so as to be conveyed, and the ink is dried during the conveyance. The paper sheet S after being dried is discharged to the paper sheet discharge unit 7.

The control unit 8 includes a CPU, a storage unit, and other electronic circuits and components (which are not shown). The CPU controls operations of individual components of the inkjet recording apparatus 1, on the basis of a control program and data stored in the storage unit, so as to perform processes related to functions of the inkjet recording apparatus 1. The paper sheet supply unit 3, the paper sheet conveyance unit 4, the recording unit 5, and the drying unit 6 each receive instructions separately from the control unit 8, and work in a synchronous manner so as to perform recording on the paper sheet S. The storage unit is constituted of a combination, for example, of a nonvolatile storage device such as a program read only memory (ROM) and a data ROM, and a volatile storage device such as a random access memory (RAM).

Figure 3:
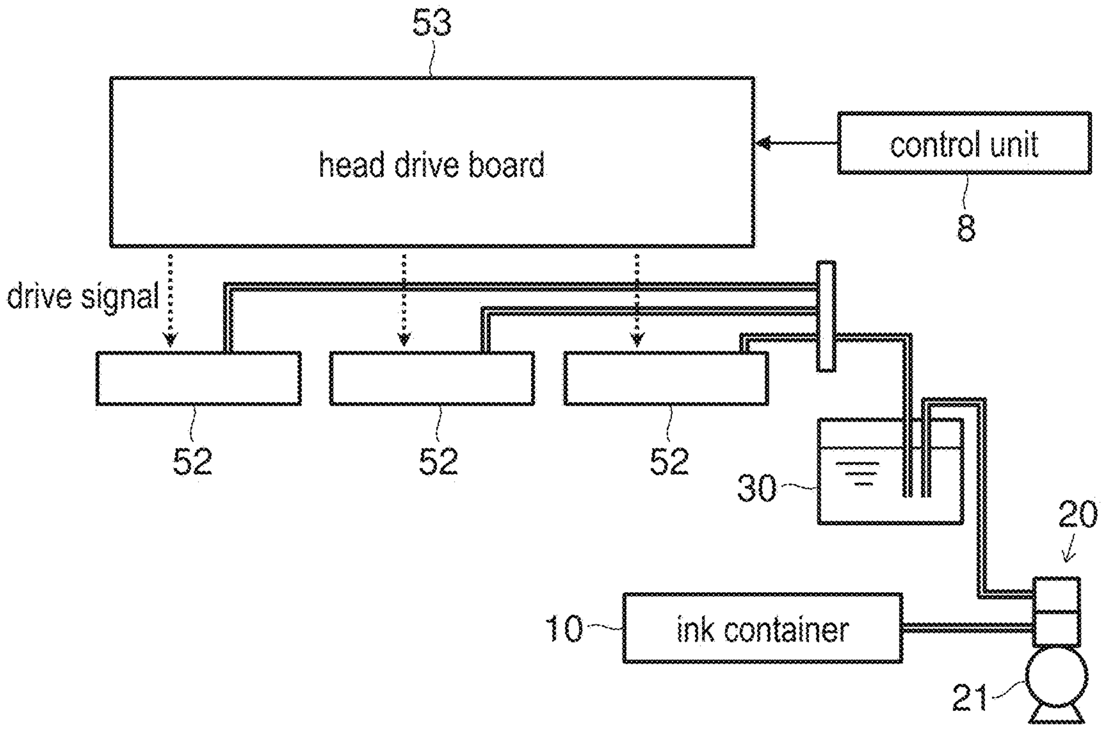
FIG. 3 is an explanatory diagram illustrating a structure of an ink feeding system and a control system of the recording unit and its vicinity of the inkjet recording apparatus illustrated in FIG. 1.
Figure 4:
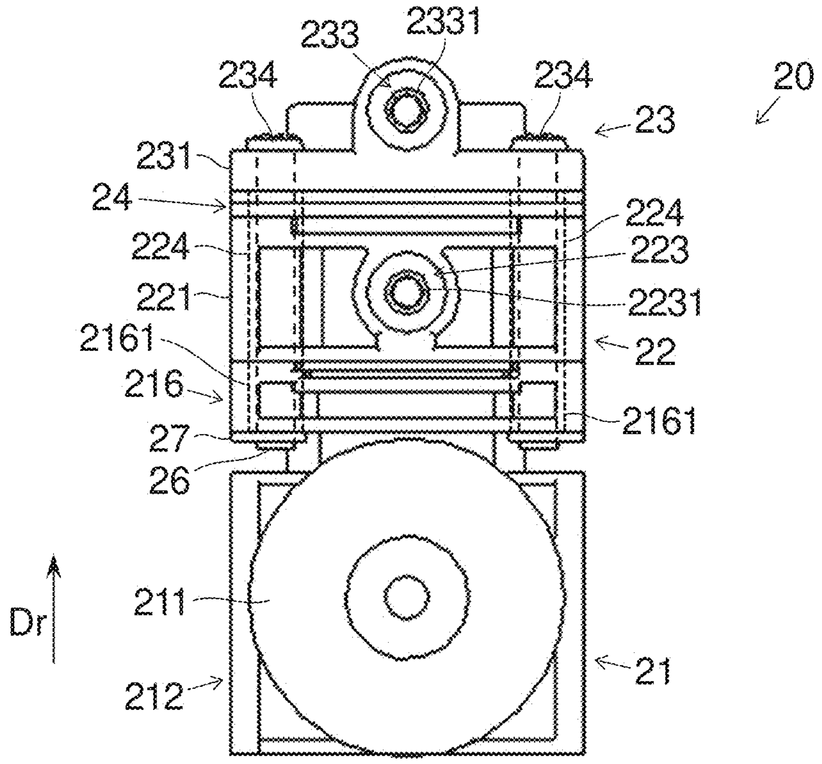
FIG. 4 is a front view of an ink feeding device illustrated in FIG. 3.
Figure 5:
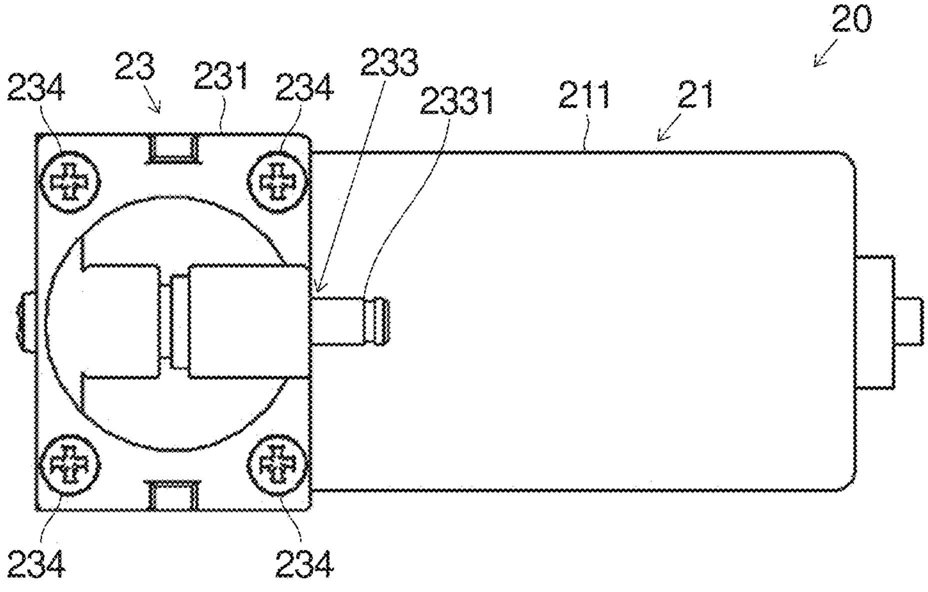
FIG. 5 is a top view of the ink feeding device illustrated in FIG. 3.

Next, a structure of the recording unit 5 and its vicinity is described with reference to FIG. 3. FIG. 3 is an explanatory diagram illustrating a structure of an ink feeding system and a control system of the recording unit 5 and its vicinity of the inkjet recording apparatus 1 illustrated in FIG. 1. The inkjet recording apparatus 1 includes an ink container 10, an ink feeding device (liquid feeding device) 20, a sub tank 30, and a head drive board 53.

The ink container 10 is disposed in an attachable and detachable manner with respect to the apparatus main body 2. The ink container 10 stores ink to be fed to the sub tank 30. The ink (liquid) in the ink container 10 is conveyed to the recording head 52 via the sub tank 30.

The ink feeding device 20 is disposed on the downstream side of the ink container 10 in the ink conveying direction. The ink feeding device 20 includes a diaphragm pump 21, and sucks the ink in the ink container 10 so as to discharge the ink toward the sub tank 30. The operation of the diaphragm pump 21 is controlled by the control unit 8. A detailed structure of the ink feeding device 20 will be described later.

The sub tank 30 stores the ink to be fed to the recording head 52. The sub tank 30 is equipped with an ink amount sensor (not shown). The control unit 8 controls the diaphragm pump 21 so as to control ink feeding amount from the ink container 10 to the sub tank 30, by driving time of the diaphragm pump 21. If the ink amount in the sub tank 30 detected by the ink amount sensor does not exceed a predetermined value after the driving time of the diaphragm pump 21 reaches a certain time, the control unit 8 determines that the ink amount in the ink container 10 is zero. Note that the sub tank 30 is managed in its ink amount at a constant water head difference with respect to the recording head 52.

The head drive board 53 is disposed adjacent to the recording head 52, and sends a drive signal to the recording head 52. The recording head 52 includes a driving element (not shown) of the ink ejection nozzle 521. The head drive board 53 sends a drive signal having a predetermined drive waveform and a predetermined drive voltage to the driving element of the ink ejection nozzle 521. The drive waveform of the driving element of the ink ejection nozzle 521 is prepared in advance according to a gradation value of a pixel (dot) of the image formed by ejected ink drops. The control unit 8 controls the head drive board 53 and can change the ejection speed of the ink ejected from the recording head 52. In this way, the control unit 8 controls operations of the recording head 52 so as to record an image on the paper sheet S.

Next, a schematic structure of the ink feeding device (liquid feeding device) 20 is described with reference to FIGS. 4 to 8, first. FIGS. 4, 5, 6, and 7 are respectively a front view, a top view, a side view, and a perspective view of the ink feeding device 20 illustrated in FIG. 3. FIG. 8 is a vertical cross-sectional side view of the ink feeding device 20 illustrated in FIG. 6.

Note that in the diagrams referred to in the following description, an arrow indicating a radial direction Dr of a motor 211 (an output shaft 211*x*) is appropriately shown, which corresponds to a reciprocating direction of a diaphragm 213 that will be described later. In a suction unit 22, in a discharge unit 23, and in a filter unit 24, a direction separating from the diaphragm 213 along the radial direction Dr (an upward direction in FIG. 8) is an ink flow direction. Specifically, with respect to the suction unit 22, the discharge unit 23, and the filter unit 24, a lower side in FIG. 8 is an upstream side in the ink flow direction, while an upper side in FIG. 8 is a downstream side in the ink flow direction.

The ink feeding device 20 includes the diaphragm pump 21, the suction unit 22, the discharge unit 23, and the filter unit 24.

The diaphragm pump 21 includes the motor 211 and a diaphragm mechanism unit 212. The diaphragm mechanism unit 212 houses the diaphragm 213. The diaphragm pump 21 allows the motor 211 to reciprocate the diaphragm 213, so as to convey the ink (liquid) by the reciprocating movement of the diaphragm 213.

The suction unit 22 is connected to the diaphragm mechanism unit 212 of the diaphragm pump 21, so as to be adjacent to the diaphragm 213. The suction unit 22 has a suction check valve 223 and an inflow chamber 222 provided to a suction casing 221. The inflow chamber 222 is communicated to the inside of the diaphragm mechanism unit 212. The ink externally flows into the inflow chamber 222 via the suction check valve 223. The suction check valve 223 allows the ink to flow only in a suction direction with respect to the diaphragm 213, i.e., in the direction flowing from the outside into the inflow chamber 222.

The discharge unit 23 is connected to the suction unit 22. In other words, the discharge unit 23 is disposed to the diaphragm mechanism unit 212 of the diaphragm pump 21 via the suction unit 22 and the filter unit 24. The discharge unit 23 has a discharge check valve 233 and an outflow chamber 232 provided to a discharge casing 231. The outflow chamber 232 is communicated to the inflow chamber 222 via the filter unit 24. The outflow chamber 232 allows the ink, which flows into it from the inflow chamber 222, to flow toward the discharge check valve 233. The discharge check valve 233 allows the ink to flow only in a discharge direction with respect to the diaphragm 213, i.e., in the direction flowing from the outflow chamber 232 to the outside.

The filter unit 24 is disposed between the suction unit 22 and the discharge unit 23, in the radial direction Dr of the output shaft 211*x* of the motor 211 (the reciprocating direction of the diaphragm 213). The filter unit 24 has a filter 241 that covers a flow cross section of the ink. The filter unit 24 removes foreign objects included in the ink flowing from the suction unit 22 to the discharge unit 23, by the filter 241.

Figure 8:
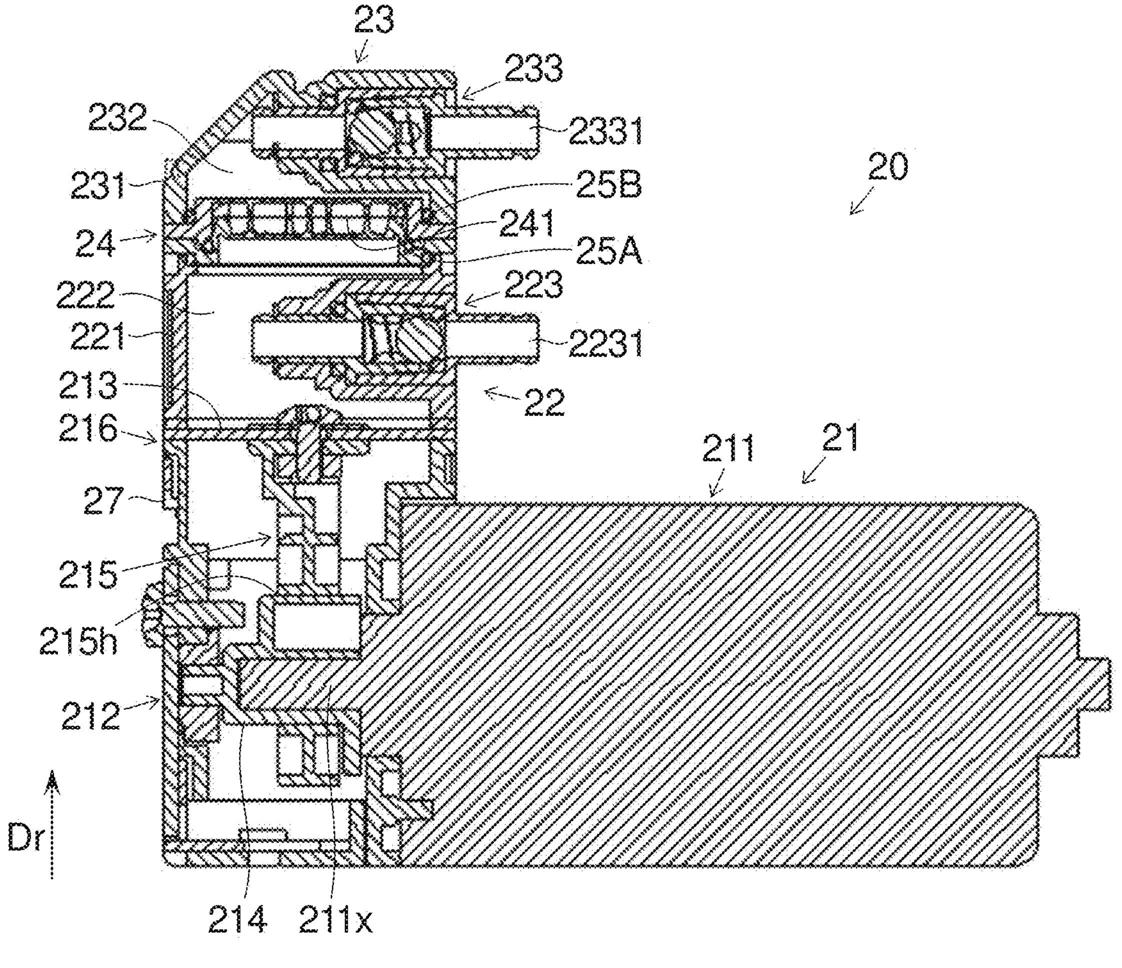
FIG. 8 is a vertical cross-sectional side view of the ink feeding device illustrated in FIG. 6.
Figure 9:
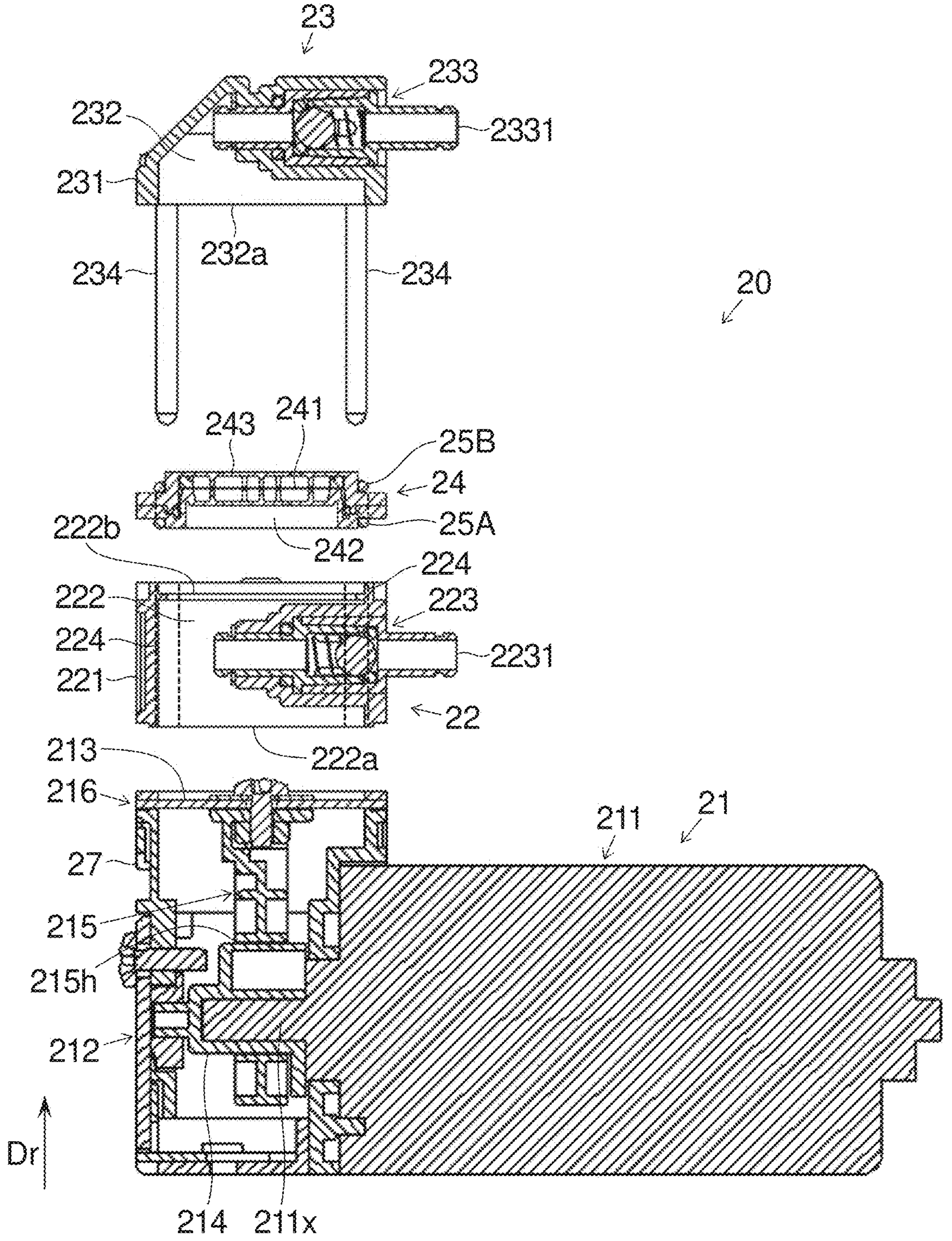
FIG. 9 is a vertical cross-sectional side view of the ink feeding device illustrated in FIG. 8, and is a diagram illustrating an exploded state.
Figure 10:
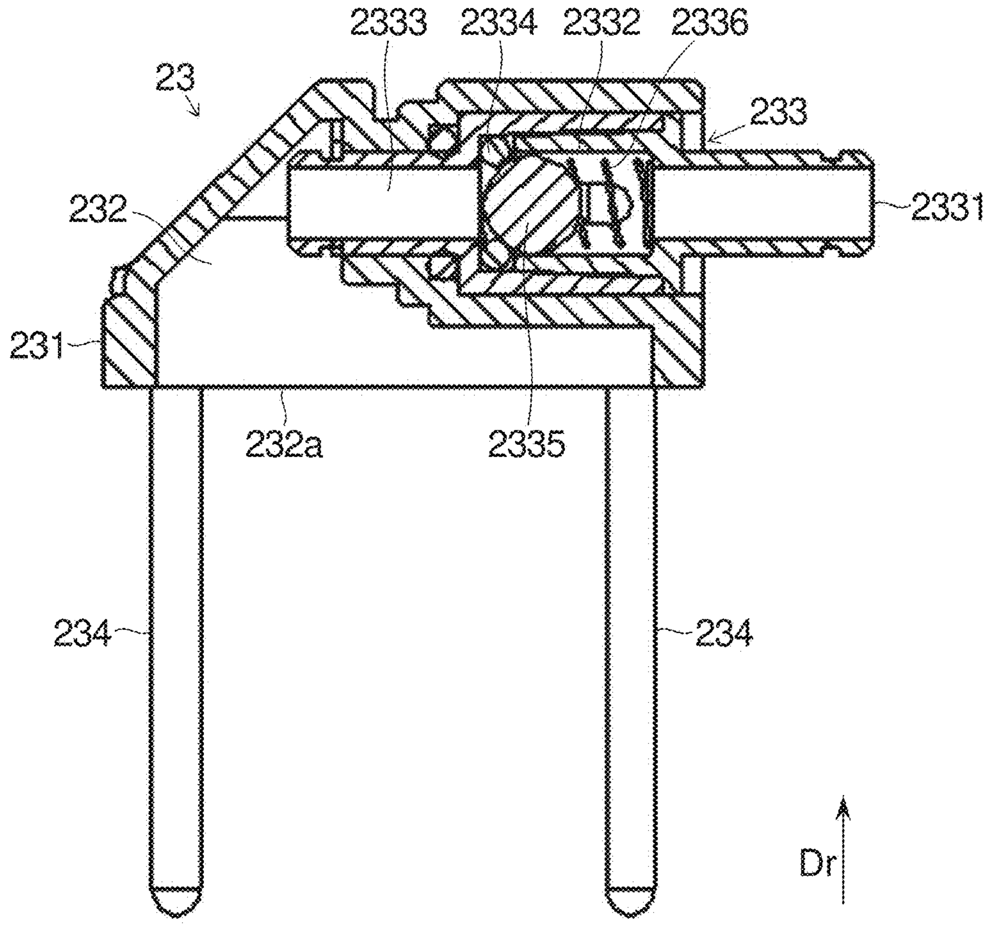
FIG. 10 is a vertical cross-sectional side view of a discharge unit of the ink feeding device illustrated in FIG. 8.
Figure 11:
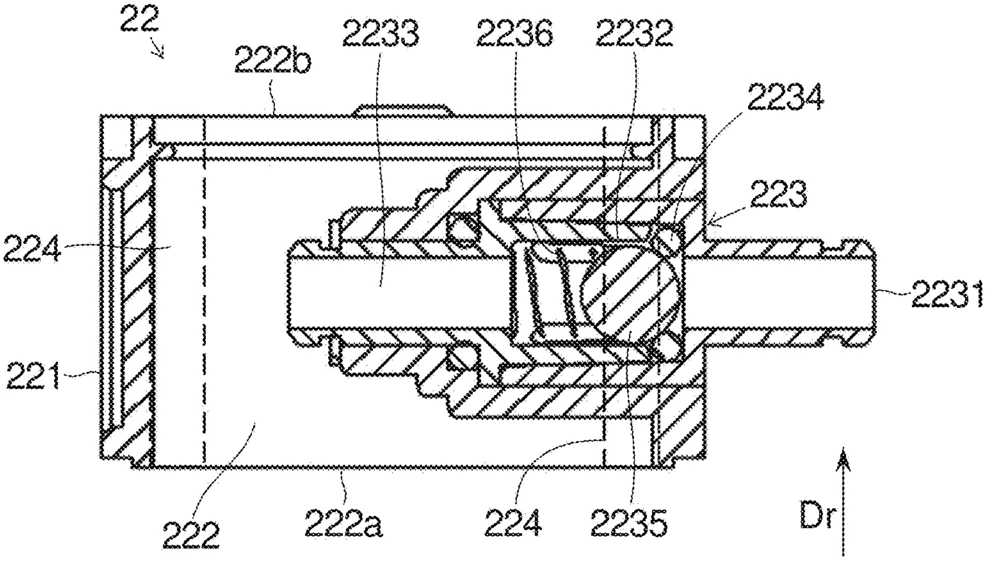
FIG. 11 is a vertical cross-sectional side view of a suction unit of the ink feeding device illustrated in FIG. 8.
Figure 12:
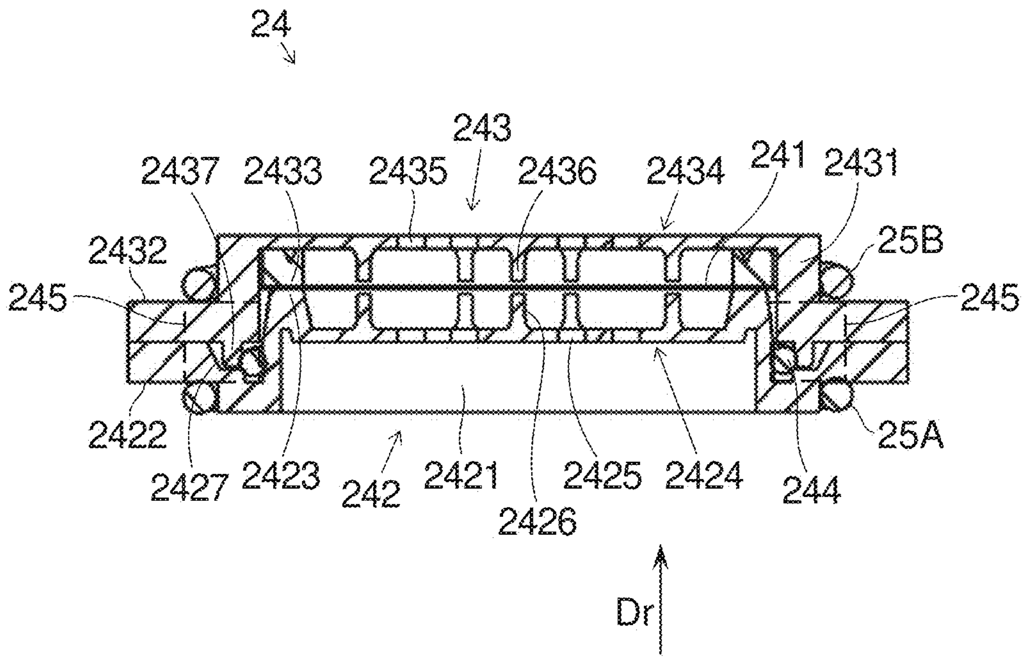
FIG. 12 is a vertical cross-sectional side view of a filter unit of the ink feeding device illustrated in FIG. 8.

Next, a detailed structure of the ink feeding device 20 is described with reference to FIGS. 9 to 12. FIG. 9 is a vertical cross-sectional side view of the ink feeding device 20 illustrated in FIG. 8, and is a diagram illustrating an exploded state. FIG. 10 is a vertical cross-sectional side view of the discharge unit 23 of the ink feeding device 20 illustrated in FIG. 8. FIG. 11 is a vertical cross-sectional side view of the suction unit 22 of the ink feeding device 20 illustrated in FIG. 8. FIG. 12 is a vertical cross-sectional side view of a filter unit 24 of the ink feeding device 20 illustrated in FIG. 8.

The diaphragm mechanism unit 212 of the diaphragm pump 21 is connected to a protruding part of the output shaft 211*x* of the motor 211. The diaphragm mechanism unit 212 includes an eccentric cam 214 and a coupling member 215 in addition to the diaphragm 213.

The eccentric cam 214 is fixed to the output shaft 211*x* of the motor 211. The eccentric cam 214 is formed in a circular shape extending outward in the radial direction Dr, viewed from an axial direction of the output shaft 211*x*, for example. The eccentric cam 214 is fixed to the output shaft 211*x* at a position shifted from the center of the circular periphery in the radial direction Dr. The motor 211 rotates the eccentric cam 214 about the axis of the output shaft 211*x*.

The coupling member 215 extends to the diaphragm 213 outside the output shaft 211*x* in the radial direction Dr. The coupling member 215 is coupled to the eccentric cam 214 and the diaphragm 213. In one end part of the coupling member 215, a hole 215*h* is formed in which an outer periphery part of the eccentric cam 214 penetrates in the axial direction of the output shaft 211*x*. The hole 215*h* of the coupling member 215 and the outer periphery part of the eccentric cam 214 are coupled in a smoothly slidable manner. When the motor 211 rotates the eccentric cam 214, the coupling member 215 reciprocates in the radial direction Dr of the output shaft 211*x*.

In addition, the diaphragm mechanism unit 212 has a diaphragm housing part 216. The diaphragm housing part 216 is positioned outside the coupling member 215 in the radial direction Dr of the output shaft 211*x*. The diaphragm housing part 216 is formed in a rectangular solid shape, i.e., in a rectangular shape viewed from the radial direction Dr of the output shaft 211*x*. The diaphragm housing part 216 has an opened side that faces the suction unit 22 and the discharge unit 23.

The diaphragm housing part 216 houses the diaphragm 213. The diaphragm 213 is fixed inside the diaphragm housing part 216. The diaphragm 213 is disposed to face the suction unit 22 and the discharge unit 23 via the opening of the diaphragm housing part 216.

The diaphragm 213 is an elastically deformable sheet-like member. The diaphragm 213 is formed in a circular shape extending in a direction perpendicular to the radial direction Dr of the output shaft 211*x*, for example. The outer periphery part of the diaphragm 213 is fixed to the diaphragm housing part 216. The center part of the diaphragm 213 is coupled to the other side of the coupling member 215, which is opposite to the one end part coupled to the eccentric cam 214.

When the motor 211 rotates the eccentric cam 214, the diaphragm 213 reciprocates in the radial direction Dr of the output shaft 211*x* via the coupling member 215. In this way, volume of the inflow chamber 222 of the suction unit 22 and the outflow chamber 232 of the discharge unit 23 increases and decreases. Thus, the diaphragm pump 21 conveys the ink by the reciprocating movement of the diaphragm 213.

The suction unit 22 is connected to the diaphragm housing part 216 so as to be adjacent to the diaphragm 213. The suction unit 22 includes the suction casing 221, the inflow chamber 222, and the suction check valve 223, as described above.

The suction casing 221 is formed in a rectangular solid shape, i.e., in a rectangular shape viewed from the radial direction Dr of the output shaft 211*x* of the motor 211. The external shape (the rectangular shape) of the suction casing 221 viewed from the radial direction Dr has the same size and shape as the external shape (the rectangular shape) of the diaphragm housing part 216 viewed from the radial direction Dr. The suction casing 221 is connected to the diaphragm housing part 216 in a sealed state for the ink inside.

The inflow chamber 222 is formed as an inside space of the suction casing 221. The inflow chamber 222 is formed in a cylindrical shape extending in the radial direction Dr of the output shaft 211*x*. The inflow chamber 222 has opened sides at one end part and the other end part in the radial direction Dr of the output shaft 211*x*, so that opening parts 222*a* and

222*b* are formed. The inflow chamber 222 is communicated to the diaphragm housing part 216 through the opening part 222*a* and faces the diaphragm 213. In addition, the inflow chamber 222 is communicated to the filter unit 24 via the opening part 222*b*. The ink flows externally into the inflow chamber 222 through the suction check valve 223.

The suction check valve 223 is attached to the suction casing 221. The suction check valve 223 is, for example, a ball type check valve having a valve body constituted of a ball. The suction check valve 223 includes a suction part 2231, a valve body housing part 2232, a liquid conduit 2233, a seal member 2234, a valve body 2235, and a biasing member 2236.

The suction part 2231 protrudes outside of the suction casing 221. The suction part 2231 is formed in a cylindrical shape and is connected to a liquid delivery tube (not shown) or the like in which the ink is conveyed. The suction unit 22 is connected to the ink container 10 (see FIG. 3) via the liquid delivery tube.

The valve body housing part 2232 is disposed continuously to the suction part 2231 on the downstream side of the suction part 2231 in the ink flow direction. The liquid conduit 2233 is disposed continuously to the valve body housing part 2232 on the downstream side of the valve body housing part 2232 in the ink flow direction. The valve body housing part 2232 and the liquid conduit 2233 are formed in a cylindrical shape extending in the ink flow direction. The liquid conduit 2233 is communicated to the inflow chamber 222.

The valve body housing part 2232 houses the seal member 2234, the valve body 2235, and the biasing member 2236.

The seal member 2234 is disposed adjacent to an inner periphery wall of the valve body housing part 2232 on the upstream side (the suction part 2231 side) of the valve body 2235 in the ink flow direction. The seal member 2234 is an O-ring made of an elastic material such as rubber, and its outer periphery part is tightly contacted with the inner periphery wall of the valve body housing part 2232. The seal member 2234 has an outer diameter that is larger than the inner diameter of the suction part 2231. The seal member 2234 has an inner diameter that is smaller than the outer diameter of the valve body 2235.

The valve body 2235 is constituted of a ball (a spherical shape), which can move in the valve body housing part 2232 in the ink flow direction. When the valve body 2235 moves to the upstream side in the ink flow direction, it contacts an inner periphery part of the seal member 2234 so as to close the suction part 2231. In this way, the suction check valve 223 allows the ink to flow only in the suction direction with respect to the diaphragm 213, while it prevents backflow of the ink.

The biasing member 2236 is disposed on the downstream side (the liquid conduit 2233 side) of the valve body 2235 in the ink flow direction. The biasing member 2236 is constituted of a helical compression spring, for example, and its helical shape has an axis extending along the center axis of the valve body housing part 2232.

An end part of the biasing member 2236 on the upstream side in the ink flow direction contacts the valve body 2235 as the ball. An end part of the biasing member 2236 on the downstream side in the ink flow direction contacts a wall surface of the valve body housing part 2232 facing the valve body 2235 at the downstream end in the ink flow direction. In this way, the biasing member 2236 biases the valve body 2235 in the direction to contact the seal member 2234, toward the upstream side in the ink flow direction. The suction check valve 223 allows the valve body 2235 to be contacted with the inner periphery part of the seal member 2234 by the biasing member 2236, and hence allows the ink to flow only in the suction direction with respect to the diaphragm 213, while it prevents backflow of the ink.

Note that when the diaphragm pump 21 works, its suction power allows the valve body 2235 to move to the downstream side in the ink flow direction against the biasing force of the biasing member 2236, and the ink flows from the outside of the suction unit 22 into the inflow chamber 222 through the suction check valve 223. When the diaphragm pump 21 is stopped, the valve body 2235 is moved by the biasing force of the biasing member 2236 to the upstream side in the ink flow direction, so as to contact the seal member 2234, and backflow of the ink can be prevented.

The discharge unit 23 is coupled to the filter unit 24. As described above, the discharge unit 23 includes the discharge casing 231, the outflow chamber 232, and the discharge check valve 233.

The discharge casing 231 is formed in a substantially rectangular solid shape, i.e., in a rectangular shape viewed from the radial direction Dr of the output shaft 211*x* of the motor 211. The external shape (the rectangular shape) of the discharge casing 231 viewed from the radial direction Dr has the same size and shape as the external shape (the rectangular shape) of the diaphragm housing part 216, the suction casing 221, and the filter unit 24 viewed from the radial direction Dr. The discharge casing 231 is connected to a the downstream side case 243 described later of the filter unit 24, in a sealed state for the ink inside.

The outflow chamber 232 is formed as an inside space of the discharge casing 231. The outflow chamber 232 is formed in a cylindrical shape extending in the radial direction Dr of the output shaft 211*x*. The outflow chamber 232 has an opened side at one end part in the radial direction Dr of the output shaft 211*x*, so that an opening part 232*a* is formed. The outflow chamber 232 is communicated to the filter unit 24 via the opening part 232*a*. The outflow chamber 232 allows ink, which flows into it from the inflow chamber 222 of the suction unit 22 through the filter unit 24, to flow out toward the discharge check valve 233.

The discharge check valve 233 is attached to the discharge casing 231. The discharge casing 231 is a ball type check valve whose valve body is constituted of a ball, for example. The discharge check valve 233 includes a discharge part 2331, a valve body housing part 2332, a liquid conduit 2333, a seal member 2334, a valve body 2335, and a biasing member 2336.

The discharge part 2331 protrudes outside of the discharge casing 231. The discharge part 2331 is formed in a cylindrical shape, and is connected to the liquid delivery tube (not shown) or the like in which the ink is conveyed. The discharge unit 23 is connected to the sub tank 30 (see FIG. 3) via the liquid delivery tube.

The valve body housing part 2332 is disposed continuously to the discharge part 2331 on the upstream side of the discharge part 2331 in the ink flow direction. The liquid conduit 2333 is disposed continuously to the valve body housing part 2332 on the upstream side of the valve body housing part 2332 in the ink flow direction. The valve body housing part 2332 and the liquid conduit 2333 are formed in a cylindrical shape extending in the ink flow direction. The liquid conduit 2333 is communicated to the outflow chamber 232.

The valve body housing part 2332 houses the seal member 2334, the valve body 2335, and the biasing member 2336.

The seal member 2334 is disposed adjacent to an inner periphery wall of the valve body housing part 2332 on the upstream side (the liquid conduit 2333 side) of the valve body 2335 in the ink flow direction. The seal member 2334 is an O-ring made of an elastic material such as rubber, and its outer periphery part is tightly contacted with the inner periphery wall of the valve body housing part 2332. The seal member 2334 has an outer diameter that is larger than the inner diameter of the liquid conduit 2333. The seal member 2334 has an inner diameter that is smaller than the outer diameter of the valve body 2335.

The valve body 2335 is constituted of a ball (a spherical shape), which can move in the valve body housing part 2332 in the ink flow direction. When the valve body 2335 moves to the upstream side in the ink flow direction, it contacts an inner periphery part of the seal member 2334 so as to close the liquid conduit 2333. In this way, the discharge check valve 233 allows the ink to flow only in the discharge direction with respect to the diaphragm 213, while it prevents backflow of the ink.

The biasing member 2336 is disposed on the downstream side (the discharge part 2331 side) of the valve body 2335 in the ink flow direction. The biasing member 2336 is constituted of a helical compression spring, for example, and its helical shape has an axis extending along the center axis of the valve body housing part 2332.

An end part of the biasing member 2336 on the upstream side in the ink flow direction contacts the valve body 2335 as the ball. An end part of the biasing member 2336 on the downstream side in the ink flow direction contacts a wall surface of the valve body housing part 2332 facing the valve body 2335 at the downstream end in the ink flow direction. In this way, the biasing member 2336 biases the valve body 2335 in the direction to contact the seal member 2334, toward the upstream side in the ink flow direction. The discharge check valve 233 allows the valve body 2335 to be contacted with the inner periphery part of the seal member 2334 by the biasing member 2336, and hence allows the ink to flow only in the discharge direction with respect to the diaphragm 213, while it prevents backflow of the ink. Note that when the diaphragm pump 21 works, its discharge power allows the valve body 2335 to move to the downstream side in the ink flow direction against the biasing force of the biasing member 2336, and the ink flows from the inside of the outflow chamber 232 to the outside of the discharge unit 23 through the discharge check valve 233. When the diaphragm pump 21 is stopped, the valve body 2335 is moved by the biasing force of the biasing member 2336 to the upstream side in the ink flow direction, so as to contact the seal member 2334, and backflow of the ink can be prevented.

By using the ball type check valve, whose valve body is constituted of a ball, as the suction check valve 223 and the discharge check valve 233, backflow of the ink can be prevented with high accuracy. Therefore, it is possible to improve ink conveying performance by the ink feeding device 20.

In addition, the suction check valve 223 is attachable and detachable from the suction casing 221 of the suction unit 22. In addition, the discharge check valve 233 is attachable and detachable from the discharge casing 231 of the discharge unit 23. According to these structures, the structure of the check valve can be easily changed. For instance, if there is little possibility that a foreign object might mix into the ink, an umbrella valve or a duck bill valve may be used instead of the ball type check valve. In this way, it is possible to achieve lower cost of the ink feeding device 20.

In addition, as illustrated in FIG. 8, the suction unit 22 and the discharge unit 23 sandwich the filter unit 24 between them, and are arranged in a stacking manner on one side of the diaphragm 213 in the reciprocating direction (on the upper side in the up and down direction in FIG. 8), with respect to the diaphragm pump 21. Specifically, the suction unit 22 and the discharge unit 23 are arranged in a stacking manner, so that the filter unit 24 is sandwiched between them, and that the inflow chamber 222 and the outflow chamber 232 face the diaphragm 213 on the one side of the diaphragm 213 in the reciprocating direction. Further, the suction unit 22, the discharge unit 23, and the filter unit 24 are attachable and detachable from each other.

Note that in this embodiment, the diaphragm pump 21 (the diaphragm housing part 216), the suction unit 22, the filter unit 24, and the discharge unit 23 are connected in this order, but the suction unit 22 and the discharge unit 23 may be exchanged. In this case, external shapes of the suction casing 221 and the discharge casing 231 should be changed so that the diaphragm pump 21 (the diaphragm housing part 216), the discharge unit 23, and the suction unit 22 can be connected in this order. Otherwise, the suction check valve 223 and the discharge check valve 233 may be exchanged.

According to the above structure, one of the suction unit 22 as the suction part of the ink and the discharge unit 23 as the discharge part of the ink, with respect to the diaphragm 213, is disposed adjacent to the diaphragm 213 so as to face the same, and the other is disposed to stack on the one. Further, either one of the suction unit 22 and the discharge unit 23 can be disposed adjacent to the diaphragm 213. In other words, positions of the suction part and the discharge part of the ink with respect to the diaphragm pump 21 can be arbitrarily changed, and it is possible to improve flexibility of the structure of the ink flow path. As a result, the ink feeding device 20 can support various structures of the inkjet recording apparatus 1 in which it is disposed, so that the ink can be efficiently conveyed.

The filter unit 24 includes the filter 241, an upstream side case 242, a downstream side case 243, and an inner seal member 244.

The filter 241 is a sheet-like member extending in a direction perpendicular to the radial direction Dr of the output shaft 211*x* of the motor 211 (the reciprocating direction of the diaphragm 213), i.e., in a direction parallel to the diaphragm 213. The filter 241 is constituted of a metal mesh filter, for example. The filter 241 is disposed between the upstream side case 242 and the downstream side case 243, so as to cover the ink flow cross section.

The upstream side case 242 is disposed on the upstream side of the filter 241 in the ink flow direction (the suction unit 22 side). The downstream side case 243 is disposed on the downstream side of the filter 241 in the ink flow direction (the discharge unit 23 side). The upstream side case 242 and the downstream side case 243 are formed in a substantially rectangular solid shape, i.e., in a rectangular shape viewed from the radial direction Dr of the output shaft 211*x* of the motor 211 (the reciprocating direction of the diaphragm 213). The external shapes (rectangular shapes) of the upstream side case 242 and the downstream side case 243 viewed from the radial direction Dr have the same size and shape as the external shapes (rectangular shapes) of the suction casing 221 and the discharge casing 231 viewed from the radial direction Dr.

The upstream side case 242 and the downstream side case 243 sandwich the filter 241 in the ink flow direction, so as to hold the filter 241.

The inner seal member 244 is disposed between the upstream side case 242 and the downstream side case 243. Specifically, the inner seal member 244 is disposed adjacent to an outer periphery part of a cylindrical part 2421 of the upstream side case 242. The inner seal member 244 is, for example, an O-ring made of an elastic material such as rubber, and its inner periphery part is tightly contacted with an outer periphery wall of the cylindrical part 2421 of the upstream side case 242. An outer periphery part of the O-ring as the inner seal member 244 is tightly contacted with the downstream side case 243. The inner seal member 244 prevents the ink from leaking from the filter unit 24 to the outside.

According to the above structure, the filter unit 24 is disposed on the upstream side in the ink flow direction of the discharge unit 23, which is disposed on the ink discharge side with respect to the diaphragm 213. In this way, foreign objects included in the ink flowing into the suction unit 22 can be removed by the filter unit 24. Therefore, it is possible to prevent the foreign objects from getting into the discharge check valve 233 of the discharge unit 23, and ink conveyance performance can be improved. In addition, the ink discharged from the discharge unit 23, i.e., the ink feeding device 20 can be without foreign objects, and it is possible to suppress breakage of the recording head 52 or deterioration in image quality.

Figure 13:
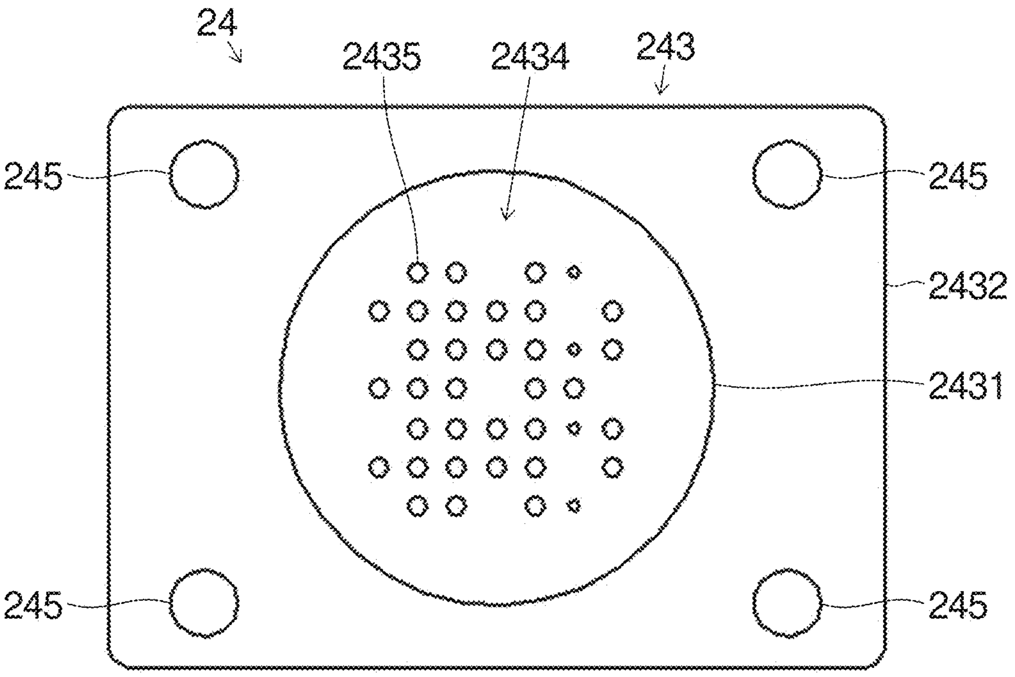
FIG. 13 is a top view of the filter unit illustrated in FIG. 12.
Figure 14:
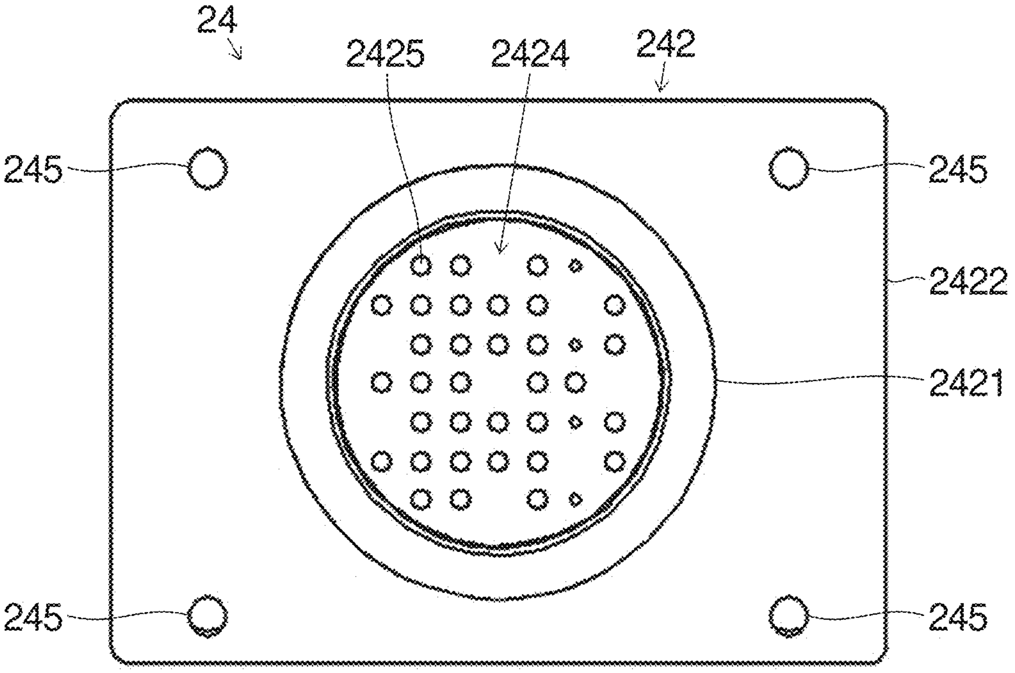
FIG. 14 is a bottom view of the filter unit illustrated in FIG. 12.
Figure 15:
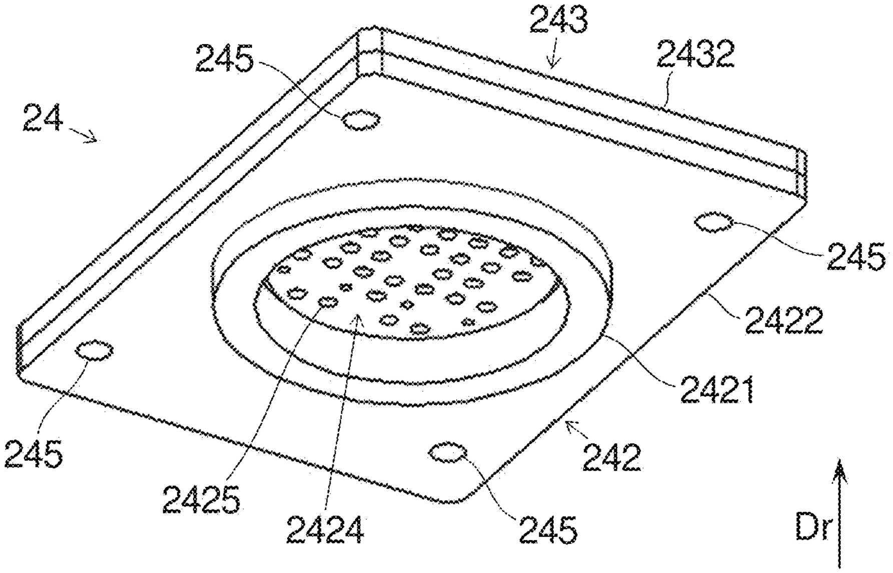
FIG. 15 is a perspective view of the filter unit illustrated in FIG. 12 viewed from an upstream side in the ink flow direction.
Figure 16:
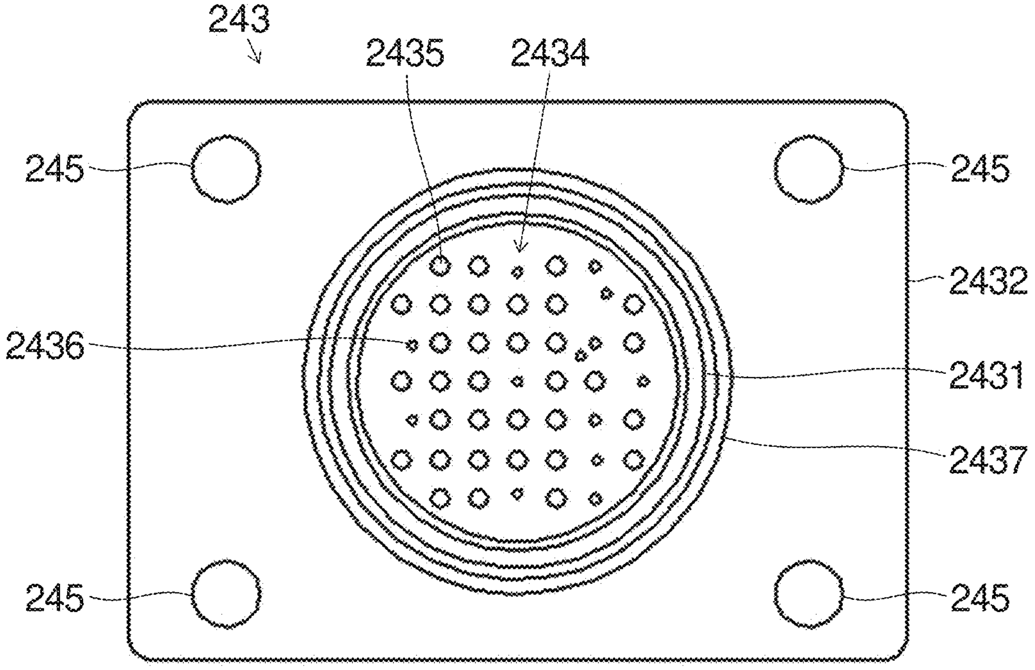
FIG. 16 is a bottom view of a downstream side case of the filter unit illustrated in FIG. 12.
Figure 17:
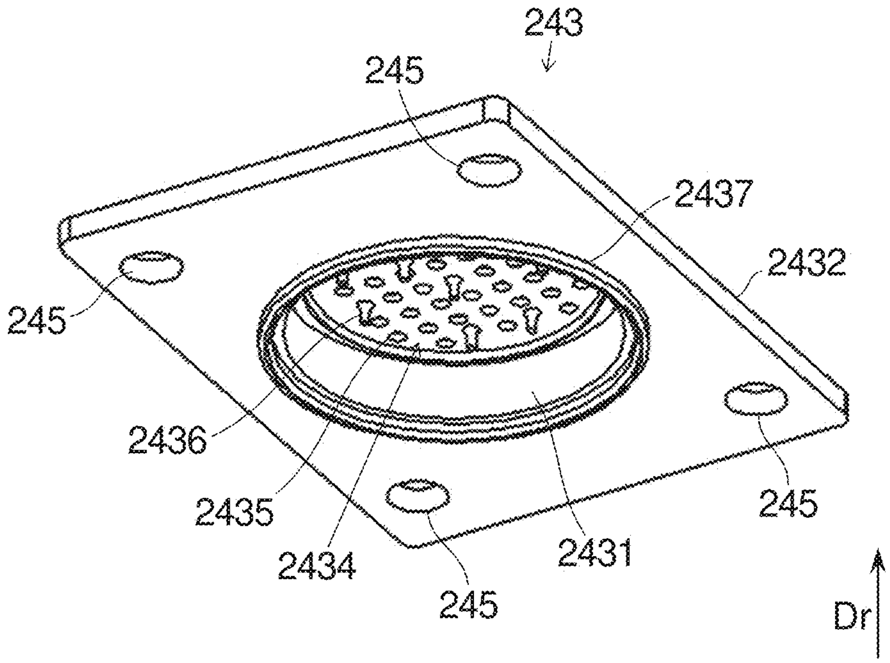
FIG. 17 is a perspective view of the downstream side case of the filter unit illustrated in FIG. 12, viewed from the upstream side in the ink flow direction.

Further, a detailed structure of the filter unit 24 is described with reference to FIGS. 13 to 17 in addition to FIG. 12. FIGS. 13, 14, and 15 are respectively a top view, a bottom view, and a perspective view viewed from the upstream side in the ink flow direction, of the filter unit 24 illustrated in FIG. 12. FIGS. 16 and 17 are a bottom view and a perspective view viewed from the upstream side in the ink flow direction, of the downstream side case 243 of the filter unit 24 illustrated in FIG. 12.

The upstream side case 242 of the filter unit 24 includes the cylindrical part 2421, a flat plate part 2422, an upstream side holding part 2423, an upstream side facing part 2424, a plurality of upstream side flow holes 2425, and a plurality of upstream side protrusions 2426.

The cylindrical part 2421 is disposed in the center part of the upstream side case 242. The cylindrical part 2421 extends in the radial direction Dr of the output shaft 211*x* of the motor 211 (the reciprocating direction of the diaphragm 213). The ink flows in the cylindrical part 2421 along the radial direction Dr.

The flat plate part 2422 extends in a flange shape outside the cylindrical part 2421 in the direction perpendicular to the radial direction Dr of the output shaft 211*x* (the reciprocating direction of the diaphragm 213). The external shape of the flat plate part 2422 is a rectangular shape viewed from the radial direction Dr of the output shaft 211*x* (the reciprocating direction of the diaphragm 213). The flat plate part 2422 faces and contacts a flat plate part 2432 of the downstream side case 243 in the ink flow direction.

The upstream side holding part 2423 is formed at the downstream end of an outer periphery part of the cylindrical part 2421 in the ink flow direction. The upstream side holding part 2423 is constituted as an annular flat surface facing the downstream side case 243. The upstream side holding part 2423 contacts the downstream side case 243 so as to sandwich the outer periphery part of the ink flow path of the filter 241.

The upstream side facing part 2424 is positioned at an inner side in the ink flow path than the upstream side holding part 2423 of the cylindrical part 2421. The upstream side facing part 2424 is disposed apart from the filter 241 on the upstream side in the ink flow direction, with respect to the downstream end of the cylindrical part 2421 in the ink flow direction. The upstream side facing part 2424 is formed in a flat circular plate shape, extending in the direction perpendicular to the radial direction Dr of the output shaft 211*x* (the reciprocating direction of the diaphragm 213), i.e., extending along the ink flow cross section. The upstream side facing part 2424 faces the filter 241 in the ink flow direction.

The plurality of upstream side flow holes 2425 are formed in the upstream side facing part 2424. The plurality of upstream side flow holes 2425 are arranged in parallel at predetermined positions in the direction perpendicular to the radial direction Dr of the output shaft 211*x* (the reciprocating direction of the diaphragm 213). The plurality of upstream side flow holes 2425 penetrate the upstream side facing part 2424 in the radial direction Dr of the output shaft 211*x* (the reciprocating direction of the diaphragm 213). The ink flows in the plurality of upstream side flow holes 2425. In other words, the ink reaching the filter unit 24 from the inflow chamber 222 of the suction unit 22 passes through the plurality of upstream side flow holes 2425 and is directed to the filter 241.

The plurality of upstream side protrusions 2426 are formed in the upstream side facing part 2424. Specifically, the plurality of upstream side protrusions 2426 are formed in the surface of the upstream side facing part 2424 facing the filter 241 on the downstream side in the ink flow direction. The plurality of upstream side protrusions 2426 are arranged in parallel at predetermined positions in the direction perpendicular to the radial direction Dr of the output shaft 211*x* (the reciprocating direction of the diaphragm 213). The plurality of upstream side protrusions 2426 protrude to the downstream side in the ink flow direction, toward the filter 241 in the radial direction Dr of the output shaft 211*x* (the reciprocating direction of the diaphragm 213). The protrusion length of the upstream side protrusion 2426 is preferably a length such as to just contact the filter 241, but it may be shorter than the length to contact the filter 241.

According to the above structure, the filter 241, which tends to displace in the ink flow direction by pressure when the ink flow, can be supported by the plurality of upstream side protrusions 2426. In this way, positional displacement or deformation of the filter 241 can be suppressed. Therefore, appropriate ink conveyance performance can be realized.

The downstream side case 243 of the filter unit 24 includes a cylindrical part 2431, the flat plate part 2432, a downstream side holding part 2433, a downstream side facing part 2434, a plurality of downstream side flow holes 2435, and a plurality of downstream side protrusions 2436.

The cylindrical part 2431 is disposed in a center part of the downstream side case 243. The cylindrical part 2431 extends in the radial direction Dr of the output shaft 211*x* of the motor 211 (the reciprocating direction of the diaphragm 213). In addition, the cylindrical part 2431 covers the downstream part in the ink flow direction of the cylindrical part 2421 of the upstream side case 242. The ink flows inside the cylindrical part 2431 along the radial direction Dr.

The flat plate part 2432 extends in a flange shape outside the cylindrical part 2431 in the direction perpendicular to the radial direction Dr of the output shaft 211*x* (the reciprocating direction of the diaphragm 213). The flat plate part 2432 has an external shape that is a rectangular shape viewed from the radial direction Dr of the output shaft 211*x* (the reciprocating direction of the diaphragm 213). The flat plate part 2432 faces and contacts the flat plate part 2422 of the upstream side case 242 in the ink flow direction.

The downstream side holding part 2433 is formed at the downstream part in the ink flow direction of an inner periphery part of the cylindrical part 2431. The downstream side holding part 2433 is constituted as an annular flat surface facing the cylindrical part 2421 of the upstream side case 242 covered by the cylindrical part 2431. The downstream side holding part 2433 contacts the upstream side case 242 so as to sandwich the outer periphery part of the ink flow path of the filter 241.

The downstream side facing part 2434 is positioned at an inner side in the ink flow path than the downstream side holding part 2433 of the cylindrical part 2431. The downstream side facing part 2434 is disposed apart from filter 241 to the downstream side in the ink flow direction, with respect to the downstream end of the cylindrical part 2431 in the ink flow direction. The downstream side facing part 2434 is formed in a flat circular plate shape, extending in the direction perpendicular to the radial direction Dr of the output shaft 211*x* (the reciprocating direction of the diaphragm 213), i.e., along the ink flow cross section. The downstream side facing part 2434 faces the filter 241 in the ink flow direction.

The plurality of downstream side flow holes 2435 are formed in the downstream side facing part 2434. The plurality of downstream side flow holes 2435 are arranged in parallel at predetermined positions, in the direction perpendicular to the radial direction Dr of the output shaft 211*x* (the reciprocating direction of the diaphragm 213). The plurality of downstream side flow holes 2435 penetrate the downstream side facing part 2434 in the radial direction Dr of the output shaft 211*x* (the reciprocating direction of the diaphragm 213). The ink flows through the plurality of downstream side flow holes 2435. In other words, in the filter unit 24, the ink passing through the filter 241 passes through the plurality of downstream side flow holes 2435, so as to be directed to the outflow chamber 232 of the discharge unit 23.

The plurality of downstream side protrusions 2436 are formed in the downstream side facing part 2434. Specifically, the plurality of downstream side protrusions 2436 are formed in a surface of the downstream side facing part 2434 facing the filter 241 on the upstream side in the ink flow direction. The plurality of downstream side protrusions 2436 are arranged in parallel at predetermined positions, in the direction perpendicular to the radial direction Dr of the output shaft 211*x* (the reciprocating direction of the diaphragm 213). The plurality of downstream side protrusions 2436 protrude toward the filter 241 to the upstream side in the ink flow direction, in the radial direction Dr of the output shaft 211*x* (the reciprocating direction of the diaphragm 213). The protrusion length of the downstream side protrusion 2436 is preferably a length such as to just contact the filter 241, but it may be shorter than the length to contact the filter 241.

According to the above structure, the filter 241, which tends to displace in the ink flow direction by pressure when the ink flow, can be supported by the plurality of downstream side protrusions 2436. In this way, positional displacement or deformation of the filter 241 can be suppressed. Therefore, appropriate ink conveyance performance can be realized.

In addition, each of the plurality of upstream side protrusions 2426 and each of the plurality of downstream side protrusions 2436 are disposed at the same position, in the direction perpendicular to the radial direction Dr of the output shaft 211*x* (the reciprocating direction of the diaphragm 213). In other words, each of the plurality of upstream side protrusions 2426 and each of the plurality of downstream side protrusions 2436 have distal end parts in the protrusion direction facing each other in the ink flow direction.

According to the above structure, two distal end parts out of the plurality of upstream side protrusions 2426 and the plurality of downstream side protrusions 2436 can sandwich the filter 241 in the ink flow direction. In this way, the effect of suppressing positional displacement or deformation of the filter 241 can be enhanced. Therefore, appropriate ink conveyance performance can be maintained.

In addition, the downstream side case 243 includes an annular rib part 2437. The annular rib part 2437 is formed on a surface of the flat plate part 2432 facing the flat plate part 2422 of the upstream side case 242. The annular rib part 2437 is formed on an outer side in the radial direction than a circular edge part of the cylindrical part 2431 on an upstream end in the ink flow direction. The annular rib part 2437 protrudes to the upstream side in the ink flow direction, toward the flat plate part 2422 of the upstream side case 242.

Note that the upstream side case 242 includes an annular recess 2427 that houses the annular rib part 2437. The annular recess 2427 is formed on a surface of the flat plate part 2422 facing the flat plate part 2432 of the downstream side case 243. The annular recess 2427 is disposed along an outer periphery surface of the cylindrical part 2421, outside the cylindrical part 2421 in the radial direction. The annular recess 2427 is recessed to the upstream side in ink flow direction. When the upstream side case 242 and the downstream side case 243 are coupled to each other, the annular recess 2427 houses the annular rib part 2437.

The annular rib part 2437 sandwiches the inner seal member 244 between itself and the cylindrical part 2421 of the upstream side case 242, in the direction perpendicular to the radial direction Dr of the output shaft 211*x* (the reciprocating direction of the diaphragm 213). In other words, the downstream side case 243 includes the annular rib part 2437 that sandwiches the inner seal member 244 between itself and the upstream side case 242. Note that it may be possible to dispose the annular rib part in the upstream side case 242, so that the inner seal member 244 is sandwiched between the annular rib part of the upstream side case 242 and the downstream side case 243.

According to the above structure, it is possible to prevent the ink from leaking from a connection part between the upstream side case 242 and the downstream side case 243. Therefore, deterioration in conveyance performance of the ink can be suppressed, and further it is possible to prevent ink contamination in the inkjet recording apparatus 1.

In addition, the ink feeding device 20 includes two outer seal members 25A and 25B. The two outer seal members 25A and 25B are, for example, O-rings made of an elastic material such as rubber.

The outer seal member 25A is disposed between the filter unit 24 and the suction unit 22. Specifically, the outer seal member 25A is disposed between an outer edge part of an upstream part in the ink flow direction of the cylindrical part 2421 of the filter unit 24 and an inner edge part of the opening part 222*b* of the suction unit 22.

The outer seal member 25B is disposed between the filter unit 24 and the discharge unit 23. Specifically, the outer seal member 25B is disposed between an outer edge part of a downstream part in the ink flow direction of the cylindrical part 2431 of the filter unit 24 and an inner edge part of the opening part 232*a* of the discharge unit 23.

The two outer seal members 25A and 25B are disposed between each of the filter unit 24, the suction unit 22, and the discharge unit 23, so as to prevent the ink from leaking to the outside. According to this structure, deterioration in conveyance performance of the ink can be suppressed, and further it is possible to prevent ink contamination in the inkjet recording apparatus 1.

Figure 6:
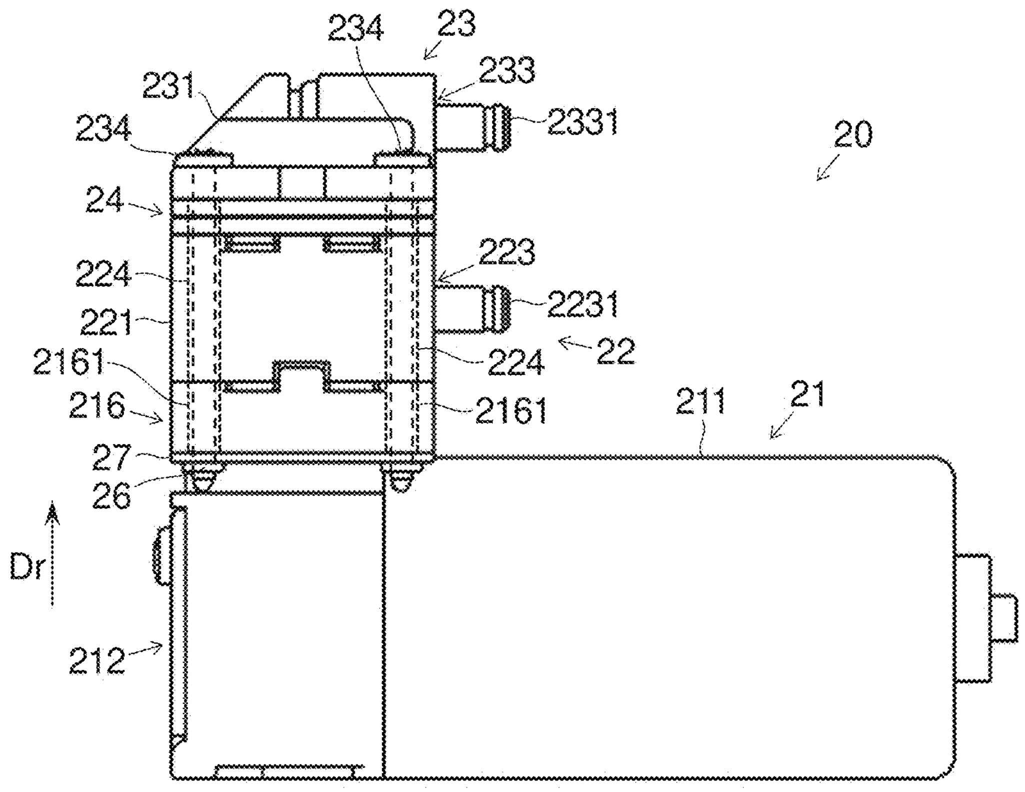
FIG. 6 is a side view of the ink feeding device illustrated in FIG. 3.
Figure 7:
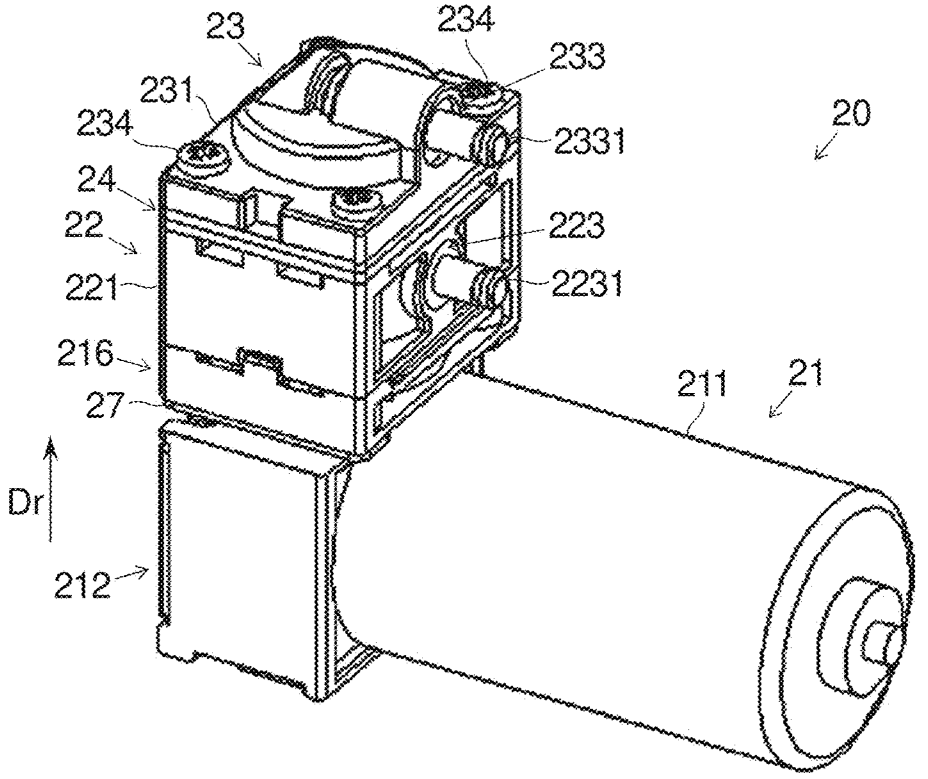
FIG. 7 is a perspective view of the ink feeding device illustrated in FIG. 3.

In addition, as illustrated in FIGS. 6, 7, and 10, the discharge unit 23 has a plurality of unit positioning shafts 234. The unit positioning shafts 234 are disposed at four corners of the discharge casing 231 having the rectangular shape viewed from the radial direction Dr of the output shaft 211*x* of the motor 211 (see FIG. 7). In other words, the discharge unit 23 has the four unit positioning shafts 234.

The four unit positioning shafts 234 extend to the filter unit 24, the suction unit 22, and the diaphragm pump 21. In other words, the four unit positioning shafts 234 extend along the radial direction Dr of the output shaft 211*x* (the reciprocating direction of the diaphragm 213). The outer periphery of the distal end part of the unit positioning shaft 234 is provided with a thread.

In addition, as illustrated in FIGS. 12, 14, and 15, the filter unit 24 has a plurality of unit positioning holes 245. The plurality of unit positioning holes 245 are formed at four corners of the filter unit 24 having a rectangular shape viewed from the radial direction Dr of the output shaft 211*x* of the motor 211. In other words, the filter unit 24 has the four unit positioning holes 245.

The four unit positioning holes 245 extend toward the discharge unit 23, the suction unit 22, and the diaphragm pump 21. In other words, the four unit positioning holes 245 extend along the radial direction Dr of the output shaft 211*x* (the reciprocating direction of the diaphragm 213), so as to penetrate the filter unit 24. Specifically, the four unit positioning holes 245 penetrate the flat plate part 2422 of the upstream side case 242 and the flat plate part 2432 of the downstream side case 243. Note that the unit positioning holes 245 are not communicated to the inside of the outer cylinder part 2421 or the inside of the cylindrical part 2431. The four unit positioning shafts 234 are inserted in the four unit positioning holes 245, respectively.

In addition, as illustrated in FIGS. 6 and 11, the suction unit 22 has a plurality of unit positioning holes 224. The unit positioning holes 224 are formed at four corners of the suction casing 221 having a rectangular shape viewed from the radial direction Dr of the output shaft 211*x* of the motor 211. In other words, the suction unit 22 has the four unit positioning holes 224.

The four unit positioning holes 224 extend toward the filter unit 24, the discharge unit 23 and the diaphragm pump 21. In other words, the four unit positioning holes 224 extend along the radial direction Dr of the output shaft 211*x* (the reciprocating direction of the diaphragm 213), so as to penetrate the suction casing 221. Note that the unit positioning holes 224 are not communicated to the inflow chamber 222. The four unit positioning shafts 234 are inserted in the four unit positioning holes 224, respectively.

In addition, as illustrated in FIG. 6, the diaphragm housing part 216 has a plurality of unit positioning holes 2161. The unit positioning holes 2161 are formed at four corners of the diaphragm housing part 216 having a rectangular shape viewed from the radial direction Dr of the output shaft 211*x* of the motor 211. In other words, the diaphragm housing part 216 has the four unit positioning holes 2161.

The four unit positioning holes 2161 extend toward the suction unit 22, the filter unit 24, and the discharge unit 23. In other words, the four unit positioning holes 2161 extend along the radial direction Dr of the output shaft 211*x* (the reciprocating direction of the diaphragm 213), so as to penetrate the diaphragm housing part 216. Note that the unit positioning holes 2161 are not communicated to the ink flowing region in the diaphragm housing part 216. The four unit positioning shafts 234 are inserted in the four unit positioning holes 2161, respectively.

The distal end parts of the four unit positioning shafts 234 protrude outward from one side (the lower side in FIG. 6) of the diaphragm housing part 216 opposite to the suction unit 22, the filter unit 24, and the discharge unit 23. The four unit positioning shafts 234 are inserted in four nuts 26 disposed on the side of the diaphragm housing part 216 opposite to the suction unit 22, the filter unit 24, and the discharge unit 23, so as to fasten the suction unit 22, the filter unit 24, the discharge unit 23, and the diaphragm housing part 216.

According to the above structure, it is possible to appropriately position the suction unit 22, the filter unit 24, and the discharge unit 23 with respect to the diaphragm pump 21 (the diaphragm housing part 216). Further, it is possible to prevent the ink from leaking from a connection part between each of the suction unit 22, the filter unit 24, the discharge unit 23, and the diaphragm housing part 216.

Figure 18:
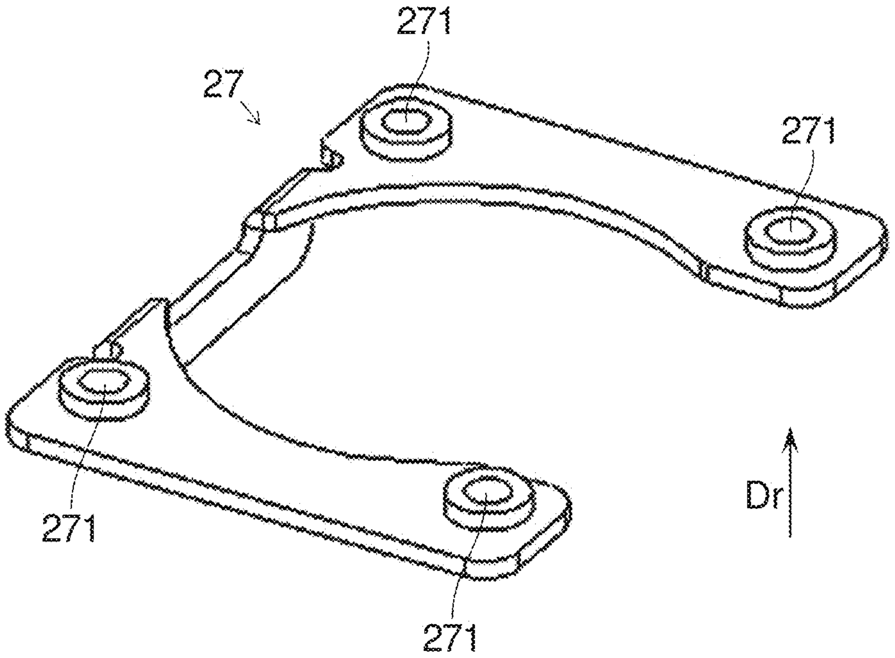
FIG. 18 is a perspective view of a plate-like member of the ink feeding device illustrated in FIG. 6.

In addition, as illustrated in FIGS. 6 and 7, a plate-like member 27 is disposed on one side (the lower side in FIG. 6) of the diaphragm housing part 216, opposite to the suction unit 22, the filter unit 24, and the discharge unit 23. The plate-like member 27 is disposed between the diaphragm housing part 216 and the four nuts 26. FIG. 18 is a perspective view of the plate-like member 27 of the ink feeding device 20 illustrated in FIG. 6.

The plate-like member 27 is formed in a C-shape viewed from the radial direction Dr of the output shaft 211*x* of the motor 211 (the reciprocating direction of the diaphragm 213). The external shape of the plate-like member 27 is a substantially rectangular shape viewed from the radial direction Dr of the output shaft 211*x*, which has the substantially same size and shape as the external shape (the rectangular shape) of the diaphragm housing part 216 viewed from the radial direction Dr. The plate-like member 27 is attached along the diaphragm housing part 216 by inserting the opened part of the C-shape in a plan view into the diaphragm mechanism unit 212.

The plate-like member 27 has a plurality of plate-like member positioning holes 271. The plate-like member positioning holes 271 are formed at four corners of the plate-like member 27 whose external shape viewed from the radial direction Dr of the output shaft 211*x* is the substantially rectangular shape. In other words, the plate-like member 27 has the four plate-like member positioning holes 271. The four plate-like member positioning holes 271 penetrate the plate-like member 27 in the radial direction Dr of the output shaft 211*x* (in the reciprocating direction of the diaphragm 213). The four unit positioning shafts 234 are inserted in the four plate-like member positioning holes 271, respectively.

By disposing the plate-like member 27 adjacent to the diaphragm housing part 216, fastening strength of the suction unit 22, the filter unit 24, the discharge unit 23, and the diaphragm housing part 216 by the unit positioning shafts 234 can be enhanced. Therefore, it is possible to effectively prevent the ink from leaking from the connection part between each of the suction unit 22, the filter unit 24, the discharge unit 23, and the diaphragm housing part 216.

Although the embodiment of the present disclosure is described above, the scope of the present disclosure is not limited to this, but can be variously modified for implementation within the scope of the present disclosure without deviating from the spirit thereof.

What is claimed is:

1. A liquid feeding device comprising:

a diaphragm pump configured to convey liquid by reciprocating movement of a diaphragm;

a suction unit including a suction check valve configured to allow the liquid to flow only in a suction direction with respect to the diaphragm, and an inflow chamber into which the liquid flows through the suction check valve;

a discharge unit including a discharge check valve configured to allow the liquid to flow only in a discharge direction with respect to the diaphragm, and an outflow chamber from which the liquid entering from the inflow chamber flows out toward the discharge check valve, and a filter unit including a filter disposed between the suction unit and the discharge unit, so as to cover a flow cross section of the liquid, wherein the suction unit and the discharge unit are arranged in a stacking manner so that the filter unit is sandwiched between them, and that the inflow chamber and the outflow chamber face the diaphragm on one side in a reciprocating direction of the diaphragm, and the filter unit includes the filter, an upstream side case and a downstream side case configured to sandwich the filter from an upstream side and a downstream side in a liquid flow direction with respect to the filter, and an inner seal member disposed between the upstream side case and the downstream side case, so as to prevent the liquid from leaking from the filter unit to outside.

2. The liquid feeding device according to claim 1, wherein the suction unit, the discharge unit, and the filter unit are attachable and detachable from each other.

3. The liquid feeding device according to claim 1, wherein one of the upstream side case the downstream side case has an annular rib part configured to sandwich the inner seal member between itself and the other.

4. The liquid feeding device according to claim 1, further comprising two outer seal members disposed between each of the filter unit, the suction unit, and the discharge unit, so as to prevent the liquid from leaking to outside.

5. The liquid feeding device according to claim 1, wherein the upstream side case includes:

an upstream side holding part configured to contact the downstream side case, so as to sandwich an outer periphery part in a liquid flow path of the filter;

an upstream side facing part positioned on an inner side in the liquid flow path than the upstream side holding part, so as to be apart from the filter to the upstream side in the liquid flow direction and to face the filter in the liquid flow direction;

a plurality of upstream side flow holes formed in the upstream side facing part so that the liquid flows through the plurality of downstream side flow holes; and a plurality of upstream side protrusions formed in the upstream side facing part so as to protrude toward the filter.

6. The liquid feeding device according to claim 1, wherein the downstream side case includes:

a downstream side holding part configured to contact the upstream side case, so as to sandwich an outer periphery part in a liquid flow path of the filter;

a downstream side facing part positioned on an inner side in the liquid flow path than the downstream side holding part, so as to be apart from the filter to the downstream side in the liquid flow direction and to face the filter in the liquid flow direction;

a plurality of downstream side flow holes formed in the downstream side facing part so that the liquid flows through the plurality of downstream side flow holes; and a plurality of downstream side protrusions formed in the downstream side facing part so as to protrude toward the filter.

7. The liquid feeding device according to claim 1, wherein one of the suction unit and the discharge unit has a plurality of unit positioning shafts to be inserted in a plurality of unit positioning holes, respectively, provided to the other of the suction unit and the discharge unit, as well as to the filter unit, the diaphragm pump includes a diaphragm housing part configured to house the diaphragm, the liquid feeding device further comprises a plate-like member disposed on a side of the diaphragm housing part opposite to the suction unit, the discharge unit, and the filter unit, the plate-like member being formed in a C-shape viewed from the reciprocating direction of the diaphragm, and the plate-like member has a plurality of plate-like member positioning holes in which the plurality of unit positioning shafts are inserted, respectively.

8. The liquid feeding device according to claim 1, wherein the discharge check valve is a ball type check valve whose valve body is constituted of a ball.

9. The liquid feeding device according to claim 1, wherein the suction check valve is attachable and detachable from a casing of the suction unit.

10. The liquid feeding device according to claim 1, wherein the discharge check valve is attachable and detachable from a casing of the discharge unit.

11. An inkjet recording apparatus comprising:

a recording head configured to eject ink so as to record an image; and the liquid feeding device according to claim 1, configured to feed ink to the recording head.

* * * * *